Patented Aug. 28, 1934

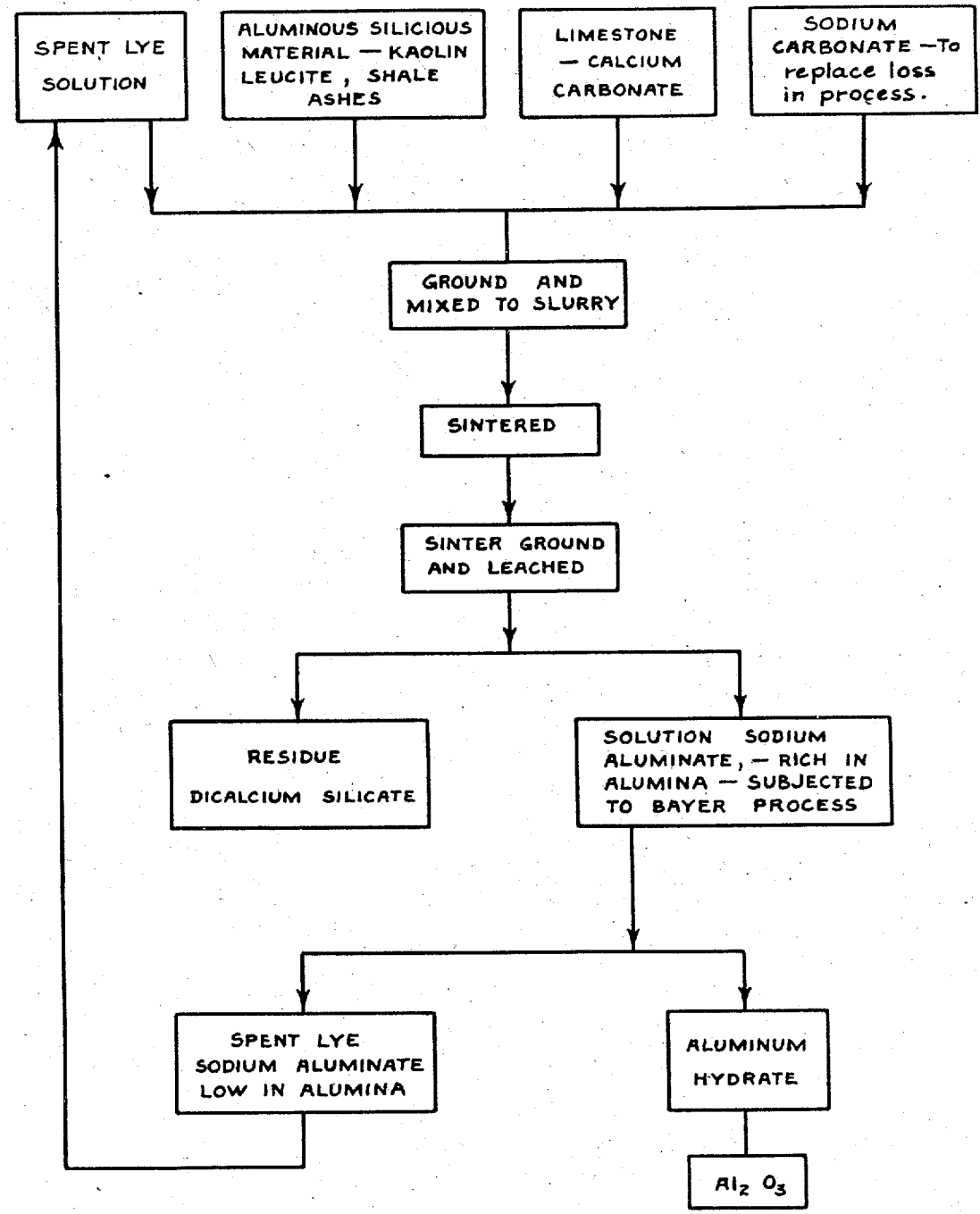

1,971,354

UNITED STATES PATENT OFFICE 1,971,354

PROCESS OF RECOVERING ALUMINA FROM ALUMINOUS SILICIOUS MATERIALS

Alfred W. Scheidt, Sewaren, N. J., and Roy C. Folger, Cleveland, Ohio, assignors to The Electric Smelting & Aluminum Company, Cleveland, Ohio, a corporation of Ohio Application August 5, 1931, Serial No. 555,268

15 Claims. (Cl. 23—143)

Our invention relates to the recovery of alumina from aluminous silicious materials, such as kaolin, shale, coal ashes, leucite and the like, and particularly relates to improvements in the process of extracting alumina from such aluminous silicious material in which a sinter is formed yielding sodium aluminate and dicalcium silicate.

An object of the present invention is to carry on this process according to an efficient, standardized method, by controlling the composition of the charge in order that the furnacing operation can be standardized and controlled to form sinters of substantially uniform composition which may readily be treated in a uniform manner to recover alumina and dicalcium silicate.

A further object of our invention is to treat the aluminous silicious material with reagents in such a manner that the most expensive reagent is continuously reused in the process.

Another object of our invention is to continuously recirculate the residual, depleted sodium aluminate resulting from the process, thus reusing the alkali, and thus adding alumina to the aluminous silicious material for enriching and standardizing the material to be furnaced.

Another object of our invention is to continuously recirculate the residual sodium aluminate formed in our process, and thus reuse the expensive alkali content, except such slight amounts as may be lost in operation.

A further object of the present invention is the addition to the raw material of the residual sodium aluminate low in alumina and the extraction of sodium aluminate high in alumina from the sinter formed.

Aluminous silicious materials of the types mentioned vary considerably in their chemical compositions. Thus, the aluminous content of such material may be anywhere from 10% to 50% as they commonly occur. Of necessity, in any large operation of a process, it is important that the supply of raw materials be of uniform quality so as to avoid the constant adjustment in treatment which non-uniformity incurs.

To secure this essential uniformity of raw materials has previously required large and expensive pre-treating plants, as, for instance, washing plants for kaolin wherein the stones, gravel, sand, etc., are removed and the kaolin prepared in substantially uniform condition with respect to aluminous content.

By our process this expensive pre-treatment of the raw materials is unnecessary.

A flow sheet of the process is shown in the accompanying drawing.

In carrying out our invention we make an intimate mixture of the finely divided aluminous silicious material, such as kaolin, with finely divided calcium carbonate and with a portion of the solution having a substantial aluminous content, which solution results from our process, and with a small amount of alkali, preferably sodium carbonate, although it is to be understood that potassium or other suitable alkali carbonates may be used. This mixture is made in such proportions that preferably 1 molecule of $SiO_2$ is present for each 2 molecules of CaO and 1 molecule of $Al_2O_3$ is present for from 1 to 1.7 molecules of $Na_2O$, and, further, that in any unit quantity of charge there will be always present the same absolute amount of alumina, alkali, silica and lime. We consider this uniformity of charge composition a very important part of our process and we are able to maintain it by proper proportioning of the constituents.

We then heat this charge to a sintering temperature suitable for the material in the charge, which may be from about 1100° to 1400° C., in a suitable furnace, such as a rotary furnace. The operations of preparing the charge and furnacing are preferably similar to those commonly used in the wet process of making Portland cement.

Since the charge as made above is of uniform and standard composition, it is unnecessary to have special controls of furnace conditions, etc., for each charge of material, and sinters are thus produced which may be treated uniformly and which will give standard and uniform amounts of sodium aluminate.

The sinters of standard and uniform composition thus produced may be ground and leached with water or dilute alkali solution to dissolve the alkali aluminate away from the insoluble residue material, which then consists mainly of dicalcium silicate.

After suitable purification, the alkali aluminate solution may be subjected to the well known Bayer process, in which previously precipitated alumina is added to the aluminate liquor and the whole agitated, whereby a large portion of the alumina separates out as aluminum hydrate. By this process as much as 80% of the aluminous content of the sodium aluminate solution may be separated as aluminum hydrate. The so-called "spent lye", from which aluminum hydrate has been extracted, then contains about 20% of the alumina in the solution and substantially all of the alkali, and usually has the ratio of about $1Al_2O_3$ to $6Na_2O$. The "spent lye", containing about 20% of the alumina content of the original alkali aluminate liquor and substantially all the alkali, may then be evaporated and concentrated to be returned in proper proportion with new aluminous silicious material and limestone and enough alkali, preferably soda ash, to make up for any loss in the process, to form a new charge to be furnaced.

Thus it will be noted that all of the alkali and part of the alumina may be thus continuously recirculated in our process, and that only a small amount of expensive alkali is required to be added, that is only enough to make up for any alkali loss in the process, such as in washing, volatilization, etc.

The fact that a portion of the alumina is returned to be utilized in the process also enables the formation of a charge from which a sinter may be produced in which the ratio of the soluble sodium aluminate to the insoluble dicalcium silicate is higher than when the entire amount of alumina is derived from the aluminous silicious material alone. In practice, it has been found that when the ratio of soluble sodium aluminate to insoluble dicalcium silicate in the sinter is high, the amount of alumina which may be extracted from the aluminous silicious material will not only be higher than when lower ratios are formed, but it will also be of greater purity. Furthermore, when the composition of the charge is so formed that a higher ratio of sodium aluminate to dicalcium silicate is obtained in the sinter than when aluminous silicious material is utilized alone, the temperature of the furnacing operation may be varied over a wider range which enables it to be more readily controlled.

Thus, our raw materials may be ordinary aluminous silicious material, limestone and a relatively small amount of alkali, and our products are highly refined alumina and dicalcium silicate. The dicalcium silicate may be used in the manufacture of Portland cement, sand-lime brick, or otherwise, and the alumina for the manufacture of aluminum.

A typical equation for the furnacing reaction is given below by way of example for an aluminous silicious material. A ratio of 1.5 molecules of $Na_2O$ to 1 molecule of $Al_2O_3$ in the sodium aluminate is given for illustration:

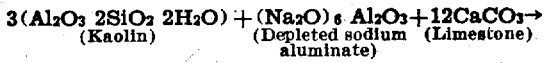
$3(Al_2O_3 \cdot 2SiO_2 \cdot 2H_2O) + (Na_2O)_6 \cdot Al_2O_3 + 12CaCO_3 \rightarrow$
(Kaolin)      (Depleted sodium    (Limestone)
            aluminate)

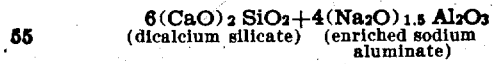
$6(CaO)_2 \cdot SiO_2 + 4(Na_2O)_{1.5} \cdot Al_2O_3$
(dicalcium silicate)    (enriched sodium
               aluminate)

It will be noted that with any aluminous silicious material there may be established a standard charge proportion of the various ingredients, whereby the best results are secured. Thus with a kaolin, which averages 35% of alumina, and with approximately 20% of the alumina content of the charge recirculated, the value for the alumina content of the charge may be set up as 42 parts. That is, a unit quantity of charge would contain 42 parts of alumina made up of 35 parts secured from kaolin and 7 parts secured from recirculated "spent lye" or depleted alkali metal aluminate. As a typical example of our process, a unit quantity of charge may be made up of 100 parts of kaolin containing 35 parts of alumina; sufficient "spent lye" to give 7 parts of alumina; from 150 to 200 parts of calcium carbonate; and from 1 to 20 parts of soda ash. It will be noted that only enough soda ash is used to make up the desired ratio of 1 molecule of alumina to from 1 to 1.7 molecules of alkali metal oxide in the charge, and that the bulk of the alkali is secured from the recirculated sodium aluminate produced. With a raw aluminous silicious material of a different alumina content a different standard charge proportion may be set up, but in any event a standard composition such as is desired may be selected and maintained by our process.

We have found that when the ratio of 1 to 1.7 molecules of $Na_2O$ to 1 molecule of $Al_2O_3$ is used favorable results are secured. When the ratio is below 1 molecule of $Na_2O$ to 1 molecule of $Al_2O_3$ the effect of volatilization of the alkali in furnacing is more serious than when the ratio is within the range specified and also less alumina is recovered. When the ratio is above 1.7 molecules of $Na_2O$ to 1 molecule of $Al_2O_3$ the operation of the Bayer precipitation process is less efficient on account of the high alkali content which makes the solution more stable and the precipitation of aluminum hydrate therefrom more difficult.

With such a standard charge mixture having a substantially uniform content of alumina, alkali, lime and silica, the furnacing of the charge and the treating of the resulting sinter may be standardized and thus the process may be operated on a large scale with a minimum of difficulty and with resulting economies incident to such uniform standardized practice.

The "spent lye" from the Bayer precipitation process usually contains about $6Na_2O$ to $1Al_2O_3$. If such alumina content is too high for addition to the charge, a further portion of the alumina content may be removed from the "spent lye" by well known means. If the alumina content of the "spent lye" from the Bayer process does not contain sufficient alumina to make a standardized charge with the aluminous silicious material being used, some of the aluminum hydrate obtained from the Bayer precipitation may be added to the charge to increase the alumina content, or alumina from any source may be added to the new charge.

It is usually preferable, however, if it is desired to use a richer content of alumina in the "spent lye" than the 1 to 6 ratio mentioned above, to stop the precipitation of the aluminum hydrate at a point which will leave the aluminous content of the "spent lye" solution present in the desired amount.

As set forth above, the sinter resulting from the furnacing operation is cooled and ground, and leached with water or dilute alkali solution to dissolve the enriched alkali aluminate away from the insoluble residue which consists mainly of dicalcium silicate.

It will thus be seen that in carrying out our process we can maintain the charge composition uniform by suitably determining the proportions of ingredients in the charge to give the most efficient result and then continuing to form standard charges in such proportions. These charges may be furnaced and treated in a uniform controlled manner, which has the great advantage, economically, of standardizing the time of sintering and other conditions which are important in operating at large plant capacity, and also to obtain uniform production and a uniform quality of products.

It will also be noted that in carrying out our process the alkali, except for minor losses in carrying out the operation, is continuously reused in the process, making it unecessary to add large quantities of costly alkali for new furnace charges.

It will also be seen that in continuously recirculating the "spent lye" we not only take advantage of reusing the costly alkali, but also of using the aluminous content of the "spent lye" for enriching and standardizing the material to be furnaced.

While we have mentioned calcium carbonate in the specific examples, it will be understood that other calcium products which are capable of reacting with aluminous silicious material to form dicalcium silicate, such as calcium oxide or limestone, may be utilized. In a similar manner alkali metal oxides may be utilized in place of the alkali metal carbonates.

Furthermore, it is to be understood that the particular compounds disclosed, and the procedure set forth, are presented for purposes of explanation and illustration, and that various equivalents can be used and modifications of said procedure can be made without departing from our invention as defined in the appended claims.

What we claim is:

1. The process of treating aluminous silicious material, which comprises forming a furnace charge of such material mixed with calcium carbonate and alkali aluminate of low alumina content in substantially the molecular proportion of 1 molecule of silica to 2 molecules of calcium oxide and of 1 molecule of alumina to from 1 to 1.7 molecules of alkali metal oxide, heating the charge to form a sinter, dissolving the alkali aluminate, separating a portion of the alumina therefrom, and returning the resulting alkali aluminate of low alumina content for reuse in the process.

2. The process of treating aluminous silicious material, which comprises mixing with the aluminous silicious material calcium carbonate, sodium aluminate low in alumina content, and sufficient sodium carbonate to form a furnace charge having substantially the molecular proportions of 1 molecule of silica to 2 molecules of calcium oxide and of 1 molecule of alumina to from 1 to 1.7 molecules of sodium oxide, heating the charge to form a sinter, dissolving out the sodium aluminate high in alumina content, separating a portion of the alumina therefrom, and returning the resulting sodium aluminate of low alumina content for reuse in the process.

3. The process of treating aluminous silicious material, which comprises mixing with the aluminous silicious material calcium carbonate, sodium aluminate low in alumina content, and sufficient alumina to form a furnace charge having substantially the molecular proportions of 1 molecule of silica to 2 molecules of calcium oxide and of 1 molecule of alumina to from 1 to 1.7 molecules of sodium oxide, heating the charge to form a sinter, dissolving out the sodium aluminate high in alumina content, separating a portion of the alumina therefrom, and returning the resulting sodium aluminate of low alumina content for reuse in the process.

4. The process of treating aluminous silicious material, which comprises mixing with the aluminous silicions material calcium carbonate, sodium aluminate low in alumina content, and sufficient sodium carbonate and alumina to form a furnace charge having substantially the molecular proportions of 1 molecule of silica to 2 molecules of calcium oxide and of 1 molecule of alumina to from 1 to 1.7 molecules of sodium oxide, heating the charge to form a sinter, dissolving out the sodium aluminate high in alumina content, separating a portion of the alumina therefrom, and returning the resulting sodium aluminate of low alumina content for reuse in the process.

5. The process of treating aluminous silicious material, which comprises forming a furnacing charge of such material mixed with calcium carbonate, sodium carbonate and sodium aluminate which has a ratio of substantially $1Al_2O_3$ to $6Na_2O$, in such proportions as to give $1SiO_2$ to $2CaO$ and $1Al_2O_3$ to from 1 to 1.7 $Na_2O$ in the said charge, heating the charge to form a sinter, dissolving out the rich sodium aluminate, separating a portion of the alumina therefrom so that the ratio of the sodium aluminate remaining is $1Al_2O_3$ to $6Na_2O$, and returning such depleted sodium aluminate for reuse in the process.

6. In the process of treating aluminous silicious material with calcium carbonate and sodium aluminate low in alumina, the steps which comprise heating the mixture to form a sinter containing dicalcium silicate and sodium aluminate rich in alumina, dissolving the rich sodium aluminate, separating a portion of the alumina from the solution, and returning the sodium aluminate low in alumina to the process.

7. The process of treating aluminous silicious material in which silica is present in relatively high proportions, which comprises forming a standardized charge of the aluminous silicious material with calcium carbonate and an alkali metal aluminate low in alumina, heating the charge to form a sinter containing alkali rich in alumina and insoluble dicalcium silicate, leaching the sinter to dissolve the alkali metal aluminate, separating a portion of the alumina therefrom, and mixing the remainder of the alkali metal aluminate with additional aluminous silicious material, calcium carbonate and a sufficient amount of alkali metal carbonate to replace the loss of alkali metal oxide in the process, in amounts sufficient to provide an additional charge having approximately the same proportions as the original charge, the alkali metal aluminate being added to recover the alkali and increase the alumina content.

8. The process of treating aluminous silicious material containing approximately 10% to 50% of alumina, which comprises mixing the material with a sufficient amount of calcium carbonate and sodium aluminate low in alumina to form a charge having approximately 2 molecules of calcium oxide to 1 molecule of silica and 1 molecule of alumina to from 1 to 1.7 molecules of sodium oxide, heating the charge to form a sinter, leaching the solution to dissolve out sodium aluminate high in alumina, precipitating a portion of the alumina from the solution, and mixing the remainder of the sodium aluminate with additional aluminous silicious material and calcium carbonate in which the ingredients are present in approximately the same proportion as in the original charge, the sodium aluminate being added to recover the alkali and increase the alumina content.

9. The process of treating aluminous silicious material containing approximately 10% to 50% alumina, which comprises mixing the material with a sufficient amount of calcium carbonate and sodium aluminate low in alumina to form a charge having approximately 2 molecules of calcium oxide to 1 molecule of silica and 1 molecule of alumina to from 1 to 1.7 molecules of sodium oxide, heating the charge to form a sinter, leaching the sinter to dissolve out the sodium aluminate high in alumina, precipitating a portion of the alumina from the solution, and mixing the remainder of the sodium aluminate with additional aluminous silicious material, calcium carbonate and sufficient sodium carbonate to replace the loss of soda in the process, in such proportions that an additional charge will be formed having approximately the same proportions as the original charge, the sodium aluminate being added to recover the alkali and increase the alumina content.

10. In the process of treating aluminous silicious material containing a substantial proportion of silica by the process steps of mixing the material with an alkali earth metal compound and an alkali metal compound, sintering the charge, dissolving out the alkali metal aluminate from the sintered charge and recovering alumina from the alkali metal aluminate solution, the improvement which comprises adding at least one of the alkali compounds in the form of an alkali aluminate low in alumina prior to the process steps recited, and thus increasing the ratio of alumina to silica.

11. In the process of treating aluminous silicious material containing a substantial proportion of silica by the process steps of mixing the material with an alkali earth metal compound and an alkali metal compound, sintering the charge, dissolving out the alkali aluminate from the sintered charge and recovering alumina from the alkali metal aluminate solution, the improvement which comprises adding aluminum hydrate prior to the process steps recited, and thus increasing the ratio of alumina to silica.

12. In the process of treating aluminous silicious material containing a substantial proportion of silica by the process steps of mixing the material with an alkali earth metal compound and an alkali metal compound, sintering the charge, dissolving out the alkali metal aluminate from the sintered charge and recovering the alumina from the alkali metal aluminate solution, the improvement which comprises adding the alkali metal compound in the form of an alkali metal aluminate low in alumina, and thus increasing the ratio of alumina to silica.

13. In the process of treating aluminous silicious material containing a substantial proportion of silica by the process steps of mixing the material with an alkali earth metal compound and an alkali metal compound, sintering the charge, dissolving out the alkali metal aluminate from the sintered charge and recovering alumina from the alkali aluminate solution, the improvement which comprises adding aluminum hydrate, together with an aluminate low in alumina, and thus increasing the ratio of alumina to silica.

14. In the process of treating aluminous silicious material containing a substantial proportion of silica by the process steps of mixing the material with calcium carbonate, and sodium compound in such proportions that the charge will contain approximately the proportion of 1 molecule of silica to 2 molecules of calcium oxide and 1 molecule of alumina to from 1 to 1.7 molecules of sodium oxide, sintering the charge, dissolving out the sodium aluminate from the sintered charge and recovering alumina from the sodium aluminate solution, the improvement which comprises adding the sodium compound in the form of a sodium aluminate solution low in alumina to the raw materials prior to the process steps recited and thus increasing the ratio of alumina to silica.

15. In the process of treating aluminous silicious material containing a substantial proportion of silica by the process steps of mixing the material with a calcium compound, and a sodium compound in such proportions that the charge will contain approximately the proportions of 1 molecule of silica to 2 molecules of calcium and 1 molecule of alumina to from 1 to 1.7 molecules of sodium oxide, sintering the charge and recovering alumina from the sodium aluminate solution, the improvement which comprises adding the sodium compound in the form of sodium aluminate low in alumina to the raw materials prior to the process steps recited, thus increasing the ratio of alumina to silica, and a sufficient amount of sodium carbonate so that the original charge upon being sintered will contain sodium oxide in the proportions specified.

ALFRED W. SCHEIDT.
ROY C. FOLGER.

CERTIFICATE OF CORRECTION.

Patent No. 1,971,354.            August 28, 1934.

ALFRED W. SCHEIDT, ET AL.

It is hereby certified that error appears in the printed specification of the above numbered patent requiring correction as follows: Page 3, line 110, claim 7, after "alkali" insert aluminate; and that the said Letters Patent should be read with this correction therein that the same may conform to the record of the case in the Patent Office.

Signed and sealed this 25th day of September, A. D. 1934.

Leslie Frazer (Seal)            Acting Commissioner of Patents.

oxide, heating the charge to form a sinter, leaching the sinter to dissolve out the sodium aluminate high in alumina, precipitating a porton of the alumina from the solution, and mixing the remainder of the sodium aluminate with additional aluminous silicious material, calcium carbonate and sufficient sodium carbonate to replace the loss of soda in the process, in such proportions that an additional charge will be formed having approximately the same proportions as the original charge, the sodium aluminate being added to recover the alkali and increase the alumina content.

10. In the process of treating aluminous silicious material containing a substantial proportion of silica by the process steps of mixing the material with an alkali earth metal compound and an alkali metal compound, sintering the charge, dissolving out the alkali metal aluminate from the sintered charge and recovering alumina from the alkali metal aluminate solution, the improvement which comprises adding at least one of the alkali compounds in the form of an alkali aluminate low in alumina prior to the process steps recited, and thus increasing the ratio of alumina to silica.

11. In the process of treating aluminous silicious material containing a substantial proportion of silica by the process steps of mixing the material with an alkali earth metal compound and an alkali metal compound, sintering the charge, dissolving out the alkali aluminate from the sintered charge and recovering alumina from the alkali metal aluminate solution, the improvement which comprises adding aluminum hydrate prior to the process steps recited, and thus increasing the ratio of alumina to silica.

12. In the process of treating aluminous silicious material containing a substantial proportion of silica by the process steps of mixing the material with an alkali earth metal compound and an alkali metal compound, sintering the charge, dissolving out the alkali metal aluminate from the sintered charge and recovering the alumina from the alkali metal aluminate solution, the improvement which comprises adding the alkali metal compound in the form of an alkali metal aluminate low in alumina, and thus increasing the ratio of alumina to silica.

13. In the process of treating aluminous silicious material containing a substantial proportion of silica by the process steps of mixing the material with an alkali earth metal compound and an alkali metal compound, sintering the charge, dissolving out the alkali metal aluminate from the sintered charge and recovering alumina from the alkali aluminate solution, the improvement which comprises adding aluminum hydrate, together with an aluminate low in alumina, and thus increasing the ratio of alumina to silica.

14. In the process of treating aluminous silicious material containing a substantial proportion of silica by the process steps of mixing the material with calcium carbonate, and sodium compound in such proportions that the charge will contain approximately the proportion of 1 molecule of silica to 2 molecules of calcium oxide and 1 molecule of alumina to from 1 to 1.7 molecules of sodium oxide, sintering the charge, dissolving out the sodium aluminate from the sintered charge and recovering alumina from the sodium aluminate solution, the improvement which comprises adding the sodium compound in the form of a sodium aluminate solution low in alumina to the raw materials prior to the process steps recited and thus increasing the ratio of alumina to silica.

15. In the process of treating aluminous silicious material containing a substantial proportion of silica by the process steps of mixing the material with a calcium compound, and a sodium compound in such proportions that the charge will contain approximately the proportions of 1 molecule of silica to 2 molecules of calcium and 1 molecule of alumina to from 1 to 1.7 molecules of sodium oxide, sintering the charge and recovering alumina from the sodium aluminate solution, the improvement which comprises adding the sodium compound in the form of sodium aluminate low in alumina to the raw materials prior to the process steps recited, thus increasing the ratio of alumina to silica, and a sufficient amount of sodium carbonate so that the original charge upon being sintered will contain sodium oxide in the proportions specified.

ALFRED W. SCHEIDT.
ROY C. FOLGER.

CERTIFICATE OF CORRECTION.

Patent No. 1,971,354.  August 28, 1934.

ALFRED W. SCHEIDT, ET AL.

It is hereby certified that error appears in the printed specification of the above numbered patent requiring correction as follows: Page 3, line 110, claim 7, after "alkali" insert aluminate; and that the said Letters Patent should be read with this correction therein that the same may conform to the record of the case in the Patent Office.

Signed and sealed this 25th day of September, A. D. 1934.

Leslie Frazer (Seal)  Acting Commissioner of Patents.